United States Patent

Norris

(10) Patent No.: US 8,982,933 B2
(45) Date of Patent: Mar. 17, 2015

(54) COMMUNICATIONS SYSTEM INCLUDING JAMMER USING CONTINUOUS PHASE MODULATION (CPM) AND ASSOCIATED METHODS

(75) Inventor: James A. Norris, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 277 days.

(21) Appl. No.: 13/169,347

(22) Filed: Jun. 27, 2011

(65) Prior Publication Data

US 2012/0327985 A1    Dec. 27, 2012

(51) Int. Cl.
     *H04K 3/00*      (2006.01)
     *H04L 5/16*      (2006.01)
     *G01S 7/38*      (2006.01)

(52) U.S. Cl.
     CPC ... *G01S 7/38* (2013.01); *H04K 3/44* (2013.01); *H04K 3/45* (2013.01)
     USPC ............... 375/221; 455/1; 375/265; 332/106; 332/113; 332/144; 332/145; 332/117

(58) Field of Classification Search
     CPC .............. G01S 7/38; H04K 3/00; B64D 1/04; H04L 27/30; H04L 25/03; H04L 25/49; H04L 23/02; H04L 25/12; H04L 5/12; H04B 1/69; H04D 3/00
     USPC ............... 455/1; 375/265, 221; 332/106, 113, 332/144, 145, 117
See application file for complete search history.

(56) References Cited

U.S. PATENT DOCUMENTS

| 5,832,022 | A | * | 11/1998 | Scott | 375/142 |
|---|---|---|---|---|---|
| 6,476,755 | B1 | * | 11/2002 | Senio et al. | 342/15 |
| 6,834,073 | B1 | * | 12/2004 | Miller et al. | 375/130 |
| 7,072,414 | B1 | * | 7/2006 | Lui et al. | 375/274 |
| 7,539,257 | B2 | | 5/2009 | Norris et al. | 375/265 |
| 7,728,755 | B1 | * | 6/2010 | Jocic | 342/20 |
| 2005/0181823 | A1 | * | 8/2005 | Haartsen | 455/553.1 |
| 2006/0098753 | A1 | * | 5/2006 | Norris et al. | 375/265 |
| 2008/0123578 | A1 | * | 5/2008 | Golitschek Edler Von Elbwart et al. | 370/312 |

(Continued)

OTHER PUBLICATIONS

Moustakas et al., "Optimizing Multi-Transmitter-Single-Receiver (MISO) Antenna Systems With Partial Channel Knowledge," mars.belllabs.com/cm/ms/what/mars/papers/physics/index3.html, pp. 1-34, May 17, 2002.

(Continued)

*Primary Examiner* — Edward Urban
*Assistant Examiner* — Ralph H Justus
(74) *Attorney, Agent, or Firm* — Allen, Dyer, Doppelt, Milbrath & Gilchrist, P.A.

(57) ABSTRACT

A communications system includes a target receiver having a passband and configured to receive an intended signal within the passband. The communications system also includes a jammer configured to jam the target receiver from receiving the intended signal. The jammer has at least one antenna, a jammer receiver coupled to the at least one antenna, a jammer transmitter coupled to the at least one antenna, and a controller configured to cooperate with the jammer receiver. The controller is configured to detect the intended signal and to generate an interfering signal comprising a continuous phase modulation (CPM) waveform having a constant envelope so that the interfering signal at least partially overlaps the passband of the target receiver.

21 Claims, 5 Drawing Sheets

(56) References Cited

U.S. PATENT DOCUMENTS

| | | | |
|---|---|---|---|
| 2008/0191924 A1* | 8/2008 | Duff et al. | 342/14 |
| 2009/0061759 A1* | 3/2009 | Stoddard et al. | 455/1 |
| 2009/0279422 A1* | 11/2009 | Fonseka et al. | 370/215 |
| 2011/0223851 A1* | 9/2011 | Stoddard | 455/1 |
| 2011/0274216 A1* | 11/2011 | Seshadri et al. | 375/322 |
| 2012/0309288 A1* | 12/2012 | Lu | 455/1 |

OTHER PUBLICATIONS

Norris, et al., "Evaluation of a Novel Constant Envelope Spread-Spectrum Modulation Technique," Harris Corporation, pp. 1-7, 2008, IEEE.

Sahai, et al., "Effective Relaying in Two-user Interference Channel with Different Models of Channel Output Feedback," pp. 1-45, IEEE Information Theory Workshop, 2009 and IEEE International Symposium on Information Theory, 2010.

* cited by examiner

COMMUNICATIONS SYSTEM INCLUDING JAMMER USING CONTINUOUS PHASE MODULATION (CPM) AND ASSOCIATED METHODS

FIELD OF THE INVENTION

The present invention relates to the field of communications systems, and more particularly, to communications systems including jammers that use continuous phase modulation and similar modulation schemes.

BACKGROUND OF THE INVENTION

In a variety of situations, it is desirable to be able to jam a receiver from receiving an intended signal. To address this need, jammers have been developed that output waveforms which create a large amount of noise, making recognition of the intended signal difficult.

Jamming is usually achieved by transmitting a jamming signal at a same frequency or in a same frequency band as that used by the intended signal. The jamming signal may block a single frequency, identified as "spot jamming," or may block a band of frequencies, identified as "barrage jamming."

Although simple jammers have long existed, technological advances required the development of improved jamming equipment. Early jammers were often simple transmitters keyed on a specific frequency thereby producing a carrier which interfered with the normal carriers at targeted local receivers. However, such single carrier jammers have become ineffective and easily avoided using, for example, frequency hopping, spread spectrum and other technologies.

Current jammers are typically either barrage jammers broadcasting broadband noise or continuous wave (CW) signals targeted at specific known intended signals. Generally, barrage jammers tend to produce a low energy density in any given communications channel, for example a 25 kHz channel, when jamming a broad band of channels. By way of example, a 200 MHz barrage jammer transmitting 100 Watts generally will have 12 mWatts in any communications channel and this low power level per channel is likely to be ineffective as a jammer. These jammers also tend to jam wanted communications.

A common jammer technique is to capture an individual local transmitter signal for a short period of time, copy the captured signal as a regenerated signal and retransmit that regenerated signal a short period of time later. Such a "regenerative" jammer creates false radar targets that appear as real targets thereby confusing the radar local receivers. In U.S. Pat. No. 6,476,755, a jammer uses time-division multiplexing techniques that permit monitoring received RF local transmitter signals while, in a time-division multiplexing sense, concurrently transmitting RF signals to jam selected transmissions at local receivers. The time-division multiplexing alternately enables the jamming system receiver and transmitter with operation at a frequency higher than the Nyquist rate. The precision required in the receiver of such a jammer may be cost prohibitive, however.

As explained above, different receivers may use different modulation formats and over the air protocols. For example, some receivers recognize frequency modulated (FM) signals, while others recognize amplitude modulated (AM) signals, pulse modulated signals, or signals modulated by other modulation schemes. To create jammers that are capable of outputting a signal to jam a given receiver of an unknown type, high resolution Fast Fourier Transform (FFT) blocks implemented via large field programmable gate arrays (FPGAs) are used so as to accurately detect the intended signal, and the jamming signal is adjusted accordingly. The use of large FPGAs to implement high resolution FFT blocks may cause a variety of issues, however. For example, such FPGAs may consume a large amount of power, and may be expensive.

Consequently, development of new jammers that reduce the chance of jamming wanted communications, that increase the chance of jamming desired intended signals, and that may allow the use of cheaper FFT blocks are desirable.

SUMMARY OF THE INVENTION

In view of the foregoing background, it is therefore an object of the present invention to provide a communications system including a jammer configured to jam a target receiver from receiving an intended signal.

This and other objects, features, and advantages in accordance with the present invention are provided by a communications system that may comprise a target receiver having a passband and configured to receive an intended signal within the passband, and a jammer configured to jam the target receiver from receiving the intended signal. The jammer may comprise at least one antenna, a jammer receiver coupled to the at least one antenna, a jammer transmitter coupled to the at least one antenna, and a controller. The controller may be configured to cooperate with the jammer receiver to detect the intended signal, and may also cooperate with the jammer transmitter to transmit an interfering signal comprising a continuous phase modulation (CPM) waveform having a constant envelope so that the interfering signal at least overlaps the intended signal.

This communications system allows for a simpler jammer receiver than is typically used in the prior art, and provides better performance while avoiding jamming desired communications channels.

The interfering signal may include at least one interfering tone within the passband of the target receiver. In addition, the target receiver may be configured to receive the interfering signal and decode at least one interfering symbol from the at least one interfering tone.

In some applications, the controller may be configured to selectively transmit the at least one interfering tone as an FM tone. Additionally or alternatively, the controller may be configured to transmit the at least one interfering tone as a plurality of interfering tones. Furthermore, the controller may be configured to transmit the continuous phase waveform over a selectable bandwidth.

The controller may be configured to detect the intended signal by performing a Fast Fourier Transform (FFT). The controller may be configured to transmit the interfering signal by transmitting a continuous phase waveform with phase memory having a phase trellis structure, and adding at least one phase pulse to the phase trellis structure. Here, the controller may be configured to generate the phase pulse as a plurality of pseudo-orthogonal phase pulses.

A method aspect is directed to a method of operating a jammer to jamming a target receiver having a passband and being configured to receive a intended signal within the passband, the jammer comprising at least one antenna, a jammer receiver coupled to the at least one antenna, a jammer transmitter coupled to the at least one antenna, and a controller configured to cooperate with the jammer receiver. The method may include detecting the intended signal, using the controller in cooperation with the jammer receiver. The method may further include generating an interfering signal comprising a continuous phase modulation (CPM) waveform having a constant envelope so that the interfering signal at least overlaps the intended signal, using the controller in cooperation with the jammer transmitter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
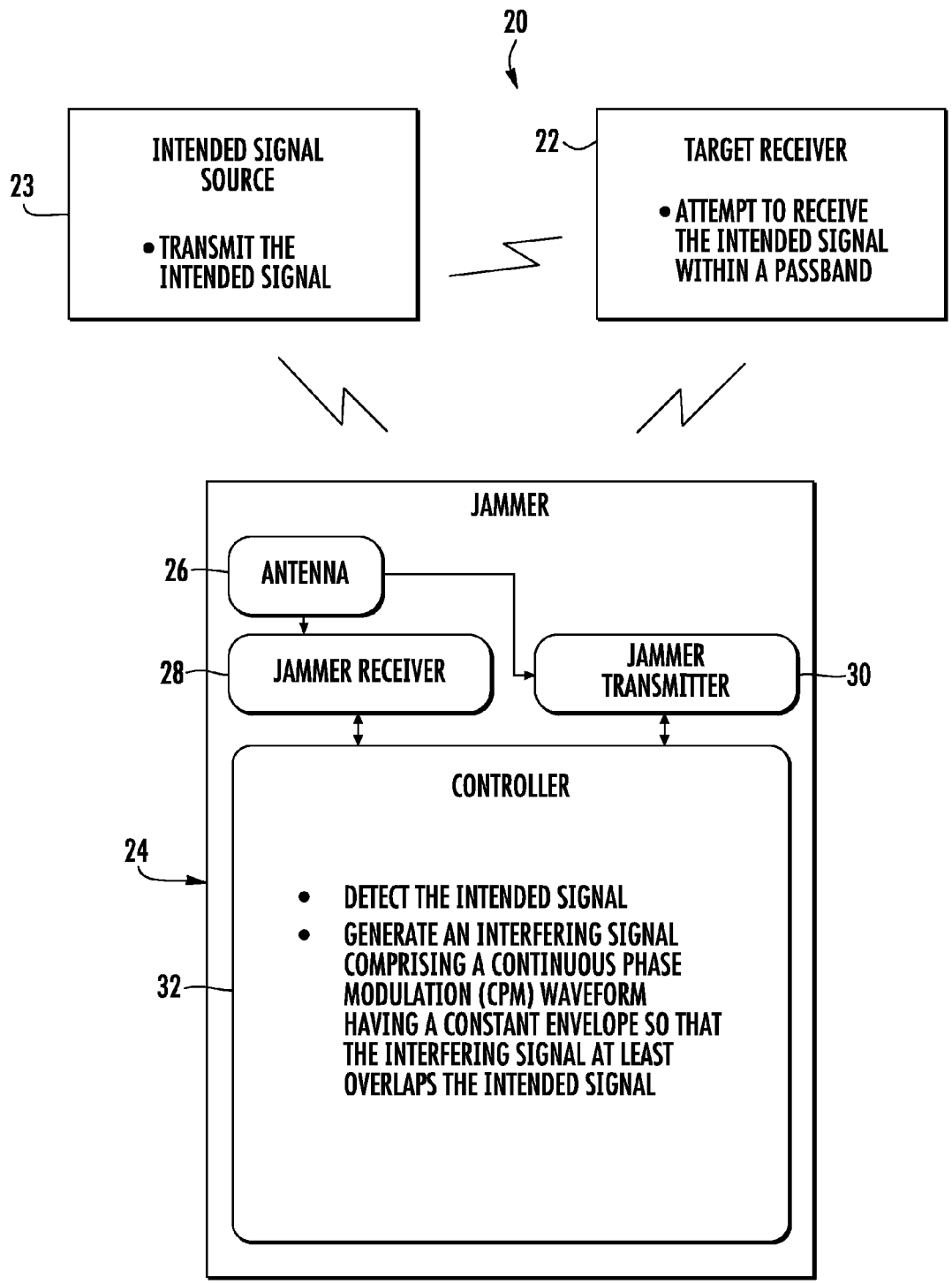
FIG. 1 is a schematic block diagram of a communications system in accordance with the present invention.

Referring initially to FIG. 1, a communications system 20 is now described. The communications system 20 includes a target receiver 22 and a jammer 24. An intended signal source 23 transmits an intended signal. The target receiver 22 has a passband, and is configured to receive the intended signal within the passband. The target receiver 22 may be a typical receiver known to those of skill in the art, operating at suitable frequencies, and according to suitable modulation schemes, such as FM, AM, and pulse modulation. Therefore, specifics of the target receiver 22 need not be addressed herein.

The jammer 24 includes at least one antenna 26 coupled to a jammer receiver 28 and a jammer transmitter 30. The jammer receiver 28 and jammer transmitter 30 are each coupled to a controller 32. The controller 32 is configured to cooperate with the jammer receiver 28 to detect the intended signal. The controller 32 is further configured to cooperate with the jammer transmitter 30 to generate an interfering signal comprising a continuous phase modulation (CPM) waveform having a constant envelope so that the interfering signal at least partially overlaps the passband of the target receiver.

This interfering signal may have a greater transmitted power than the intended signal, and therefore the target receiver 22 may receive the interfering signal instead of the intended signal. Therefore, the interfering signal "jams" the target receiver 22 from receiving the intended signal.

The CPM waveform is a constant envelope modulation that provides an inherent phase and frequency diversity which has some similar properties to the standard spread-spectrum modulation. The CPM equation starts with:

$$s(t) = \sqrt{2E/T} \cos\left(2\pi ft + 2\pi \sum_{i=0}^{n} \alpha_i h_i q_i(t - iT)\right)$$

where E is the symbol energy, T is the symbol time, f is the carrier frequency, $\alpha_i$ are M-ary data symbols taken from the alphabet $\{+/-1, +/-3, \ldots, (M-1)\}$, M being an even number, hi is a modulation index, q(t) is the phase response and is normalized such that q(t)=0 for t≤0 q(t)=½ for t≥LT, L being the memory of the CPM modulation scheme. In addition:

$q_n(t)=(-1)^n r_c$, with $0 < t \leq T/2$ $q_n(t)=(-1)^n+(1-(-1)^n)r_c$, with $T/2 < t \leq T$ where $r_c$ is defined as $(1-\cos((\pi/2)(t/T))/2$, with $0 < t \leq T$.

Further details of the CPM waveform and generation thereof can be found in U.S. Pat. No. 7,539,257, assigned to the assignee of this patent application, which is hereby incorporated by reference in its entirety.

Figure 2:
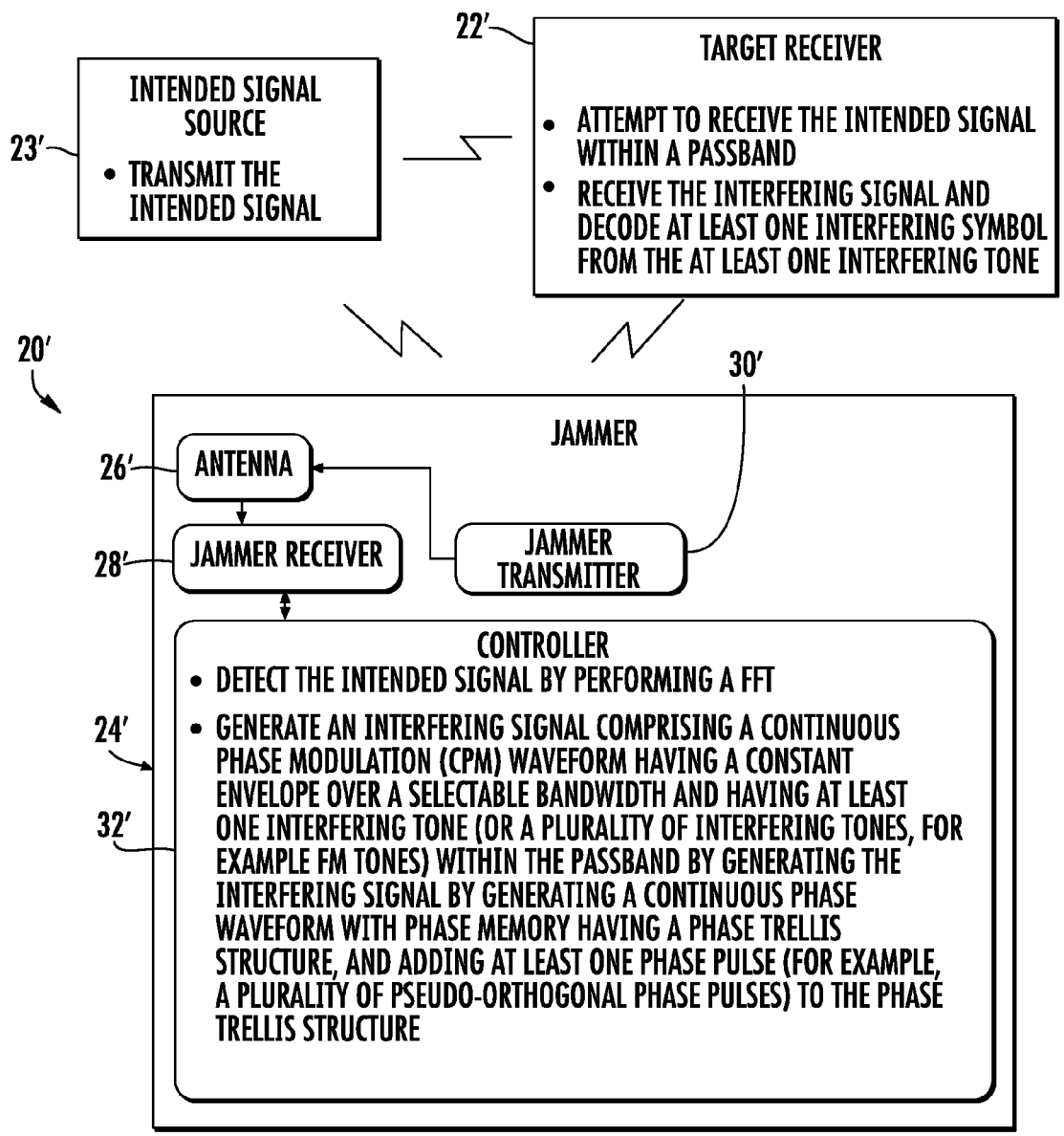
FIG. 2 is a more detailed block diagram of a communications system in accordance with the present invention.

With reference to FIG. 2, further details of the communications system 20' are now given. Here, the controller 32' cooperates with the jammer receiver 28' to detect the intended signal by performing a Fast Fourier Transform (FFT). In addition, the controller 32' may cooperate with the jammer transmitter 30' to generate the CPM waveform to have at least one interfering tone within the passband. The interfering tone may be generated as an FM tone or other tone, for example. When the target receiver 22' receives the interfering signal, it then decodes at least one interfering symbol from the at least one interfering tone.

A particularly advantageous property of the interfering signal is that the at least one tone may be decoded into at least one interfering symbol, thereby avoiding attenuation by filters in the target receiver 22' that might otherwise defeat an interfering signal that acts as noise and may not be decoded into at least one interfering symbol.

Figure 3:
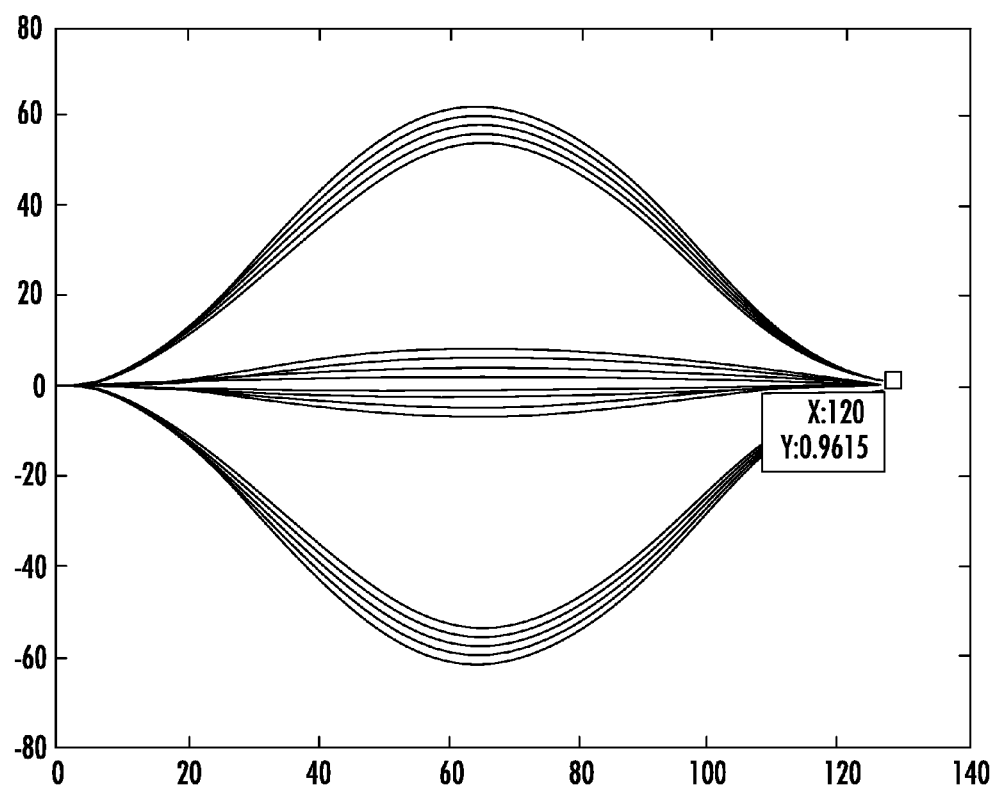
FIG. 3 is a graph of an interfering signal generated by the jammer of FIG. 2 showing the phase trellis structure.
Figure 5:
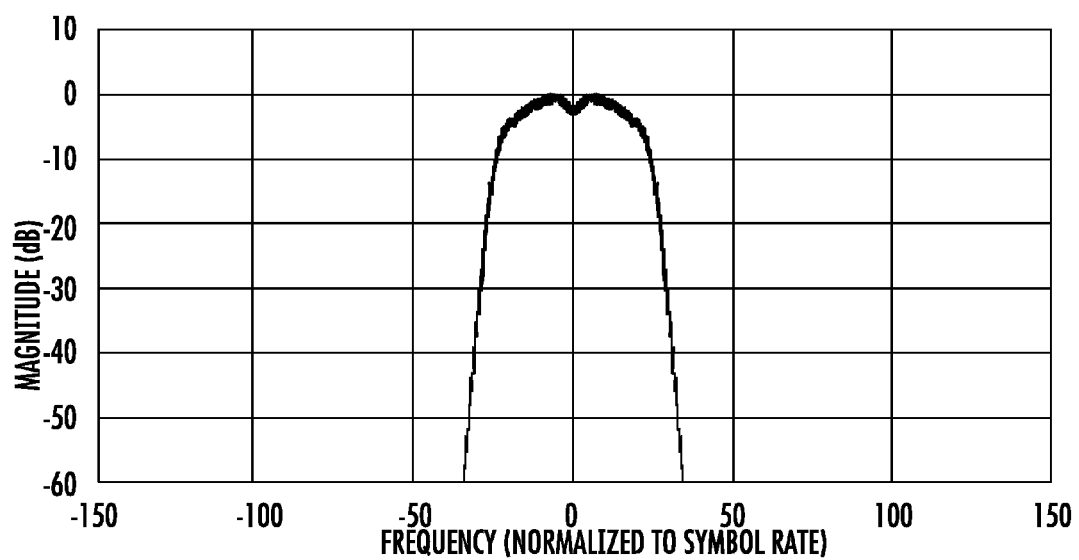
FIG. 5 is a method of operating the jammer of FIG. 1.

The CPM waveform may have a phase memory with a phase trellis structure, and at least one phase pulse may be added to the phase trellis structure. The phase pulse may be a plurality of pseudo-orthogonal phase pulses, for example. Any phase pulse can be used as long as the start and end position of phase pulses is the same (or modulo 2PI), as will be appreciated by those of skill in the art. An example CPM waveform with the phase trellis structure and having 64 phase pulses is shown in FIG. 3. Another example CPM waveform is shown in FIG. 5.

Those skilled in the art will appreciate that the interfering signal may include a plurality of interfering tones and that the number of interfering tones in the interfering signal may be selectable based upon an input device coupled to the controller 32'. Similarly, the interfering signal may be generated over a bandwidth selectable based upon an input device.

The controller 32' and jammer transmitter 30' adjust the bandwidth by increasing the number of phase pulses added to the phase trellis structure (e.g. 128 phase pulses, 256 phase pulses, 512 phase pulses). The bandwidth may also be adjusted by increasing the number of data signals (e.g. going from a 4-ary system to a 16-ary system). In fact, with prior art devices, by increasing the number of data signals, undesirable side lobes are formed, however with the constant phase modulation used in this jammer 24', the number of data signals may be increased without the formation of such undesirable side lobes.

Another advantage of the interfering signal generated by the jammer 24' is that, due to the adjustability of the bandwidth, the FFT performed need not be a high resolution FFT. Consequently, the circuitry in the jammer receiver 28' that performs the FFT, which is preferably a field programmable gate array (FPGA), can be simpler than that used in prior art jammer receivers, thereby saving power and reducing the cost of the jammer 24'.

Figure 4:
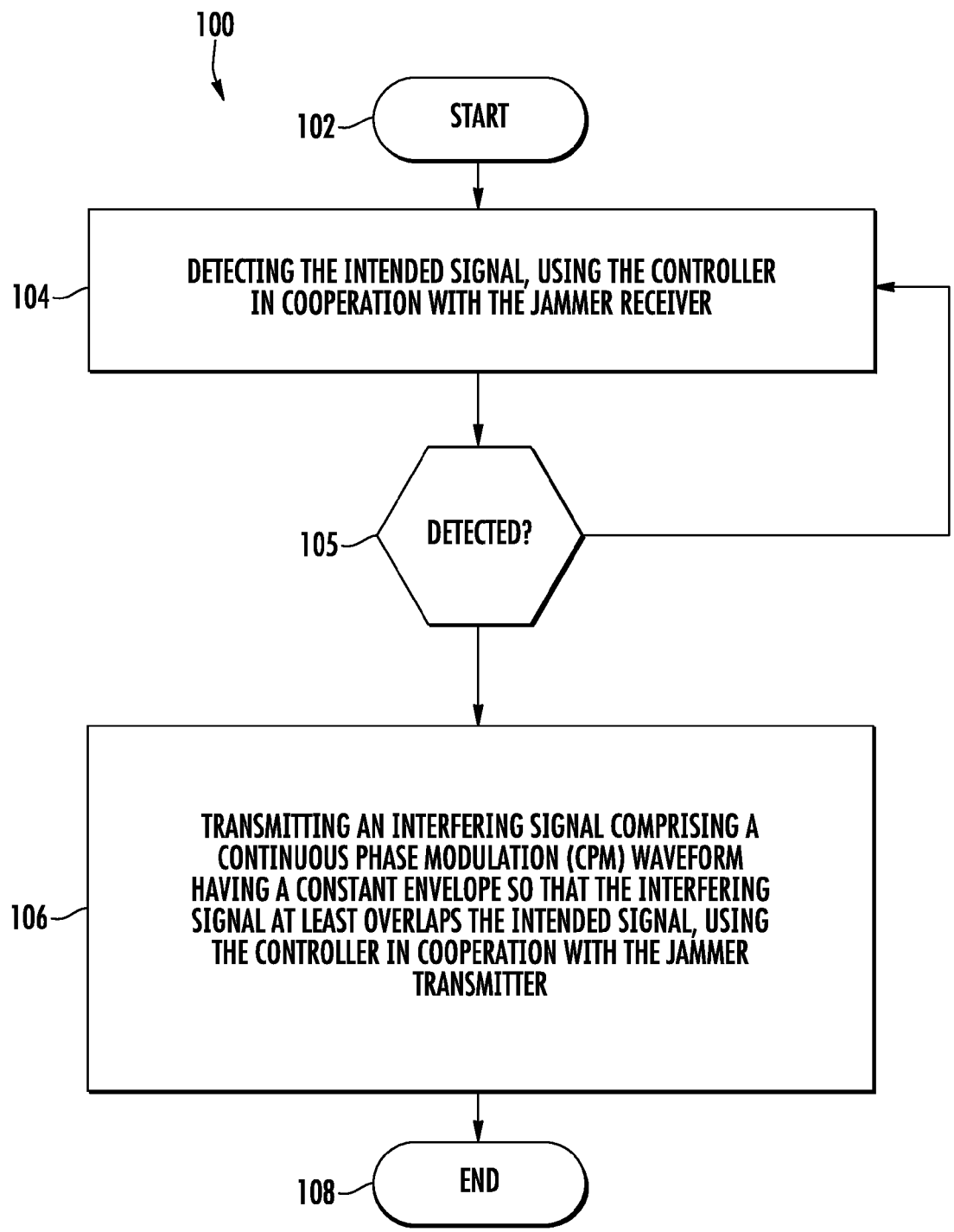
FIG. 4 is another graph of the interfering signal generated by the jammer of FIG. 2

With reference to the flowchart 100 of FIG. 4 5, a method of operating a jammer to jamming a target receiver having a passband and being configured to receive an intended signal within the passband, the jammer comprising at least one antenna, a jammer receiver coupled to the at least one antenna, a jammer transmitter coupled to the at least one antenna, and a controller configured to cooperate with the jammer receiver, is now described. After the start (Block 102), the method includes detecting the intended signal, using the controller in cooperation with the jammer receiver (Block 104). At Block 105, if the intended signal is detected, the method proceeds to Block 106, and therefore includes transmitting an interfering signal comprising a continuous phase modulation (CPM) waveform having a constant envelope so that the interfering signal at least overlaps the intended signal, using the controller in cooperation with the jammer transmitter (Block 106). If the intended signal is not detected, then, at Block 105, the method returns to detecting at Block 104. Block 108 indicates the end of the method.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
a target receiver having a passband and configured to receive an intended signal within the passband;
a jammer configured to jam said target receiver from receiving the intended signal and comprising
at least one antenna,
a jammer receiver coupled to said at least one antenna,
a jammer transmitter coupled to said at least one antenna, and
a controller configured to cooperate with said jammer receiver to detect the intended signal and cooperate with said jammer transmitter to transmit an interfering signal comprising a continuous phase modulation (CPM) waveform having a constant envelope so that the interfering signal jams the intended signal by at least overlapping the intended signal, with the interfering signal based upon a plurality of data symbols, with each data symbol having a different phase pulse shape.

2. The communications system of claim 1, wherein said controller is configured to transmit the interfering signal including at least one interfering tone within the passband of said target receiver.

3. The communications system of claim 2, wherein said target receiver is configured to receive the interfering signal and decode at least one interfering symbol from the at least one interfering tone.

4. The communications system of claim 2, wherein said controller is configured to selectively transmit the at least one interfering tone as an FM tone.

5. The communications system of claim 2, wherein said controller is configured to transmit the at least one interfering tone as a plurality of interfering tones.

6. The communications system of claim 1, wherein said controller is configured to transmit the continuous phase waveform over a selectable bandwidth.

7. The communications system of claim 1, wherein said controller is configured to detect the intended signal by performing a Fast Fourier Transform (FFT).

8. The communications system of claim 1, wherein said controller is configured to generate the interfering signal by generating a continuous phase waveform with phase memory having a phase trellis structure, and adding at least one phase pulse to the phase trellis structure.

9. The communications system of claim 8, wherein said controller is configured to transmit the phase pulse as a plurality of pseudo-orthogonal phase pulses.

10. A jammer for jamming a target receiver having a passband and being configured to receive a intended signal within the passband, the jammer comprising:
at least one antenna;
a jammer receiver coupled to said at least one antenna;
a jammer transmitter coupled to said at least one antenna; and
a controller configured to cooperate with said jammer receiver to detect the intended signal and cooperate with said jammer transmitter to transmit an interfering signal comprising a continuous phase modulation (CPM) waveform having a constant envelope so that the interfering signal jams the intended signal by at least overlapping the intended signal, with the interfering signal based upon a plurality of data symbols, with each data symbol having a different phase pulse shape.

11. The jammer of claim 10, wherein said controller is configured to transmit the interfering signal including at least one interfering tone within the passband of said target receiver.

12. The jammer of claim 11, wherein said controller is configured to selectively transmit the at least one interfering tone as an FM tone.

13. The jammer of claim 11, wherein said controller is configured to transmit the at least one interfering tone as a plurality of interfering tones.

14. The jammer of claim 10, wherein said controller is configured to transmit the continuous phase waveform over a selectable bandwidth.

15. The jammer of claim 10, wherein said controller is configured to detect the intended signal by performing a Fast Fourier Transform (FFT).

16. A method of operating a jammer to jamming a target receiver having a passband and being configured to receive a intended signal within the passband, the jammer comprising at least one antenna, a jammer receiver coupled to the at least one antenna, a jammer transmitter coupled to the at least one antenna, and a controller configured to cooperate with the jammer receiver, the method comprising:
detecting the intended signal, using the controller in cooperation with the jammer receiver; and
transmitting an interfering signal comprising a continuous phase modulation (CPM) waveform having a constant envelope so that the interfering signal jams the intended signal by at least overlapping the intended signal, using the controller in cooperation with the jammer transmitter, with the interfering signal based upon a plurality of data symbols, with each data symbol having a different phase pulse shape.

17. The method of claim 16, wherein the interfering signal includes at least one interfering tone within the passband of the target receiver.

18. The method of claim 17, wherein the at least one interfering tone is selectively transmitted as an FM tone.

19. The method of claim 17, wherein the at least one interfering tone is transmitted as a plurality of interfering tones.

20. The method of claim 16, wherein the continuous phase waveform is transmitted over a selectable bandwidth.

21. The method of claim 16, wherein the intended signal is detected by performing a Fast Fourier Transform (FFT).

* * * * *